No. 822,423. PATENTED JUNE 5, 1906.
R. BATES.
HOSE COUPLING.
APPLICATION FILED JULY 13, 1905.
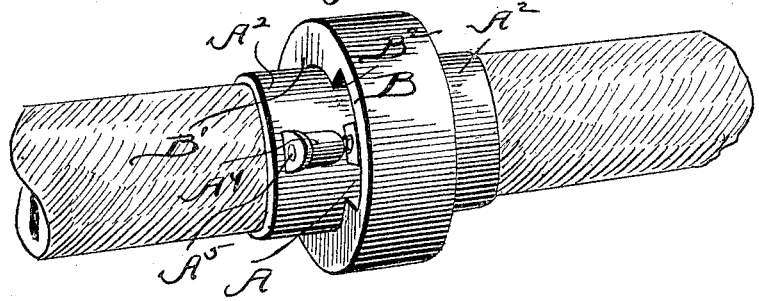
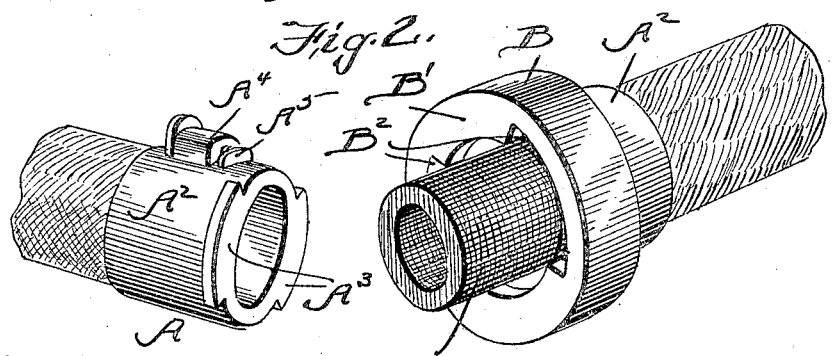
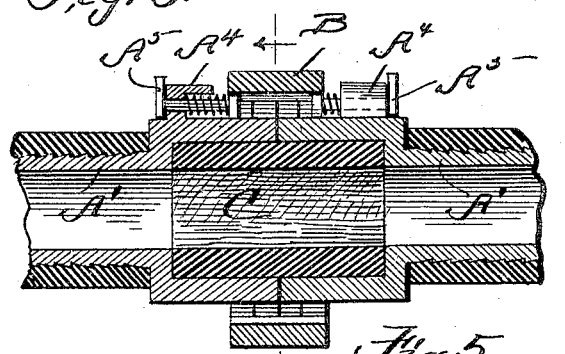
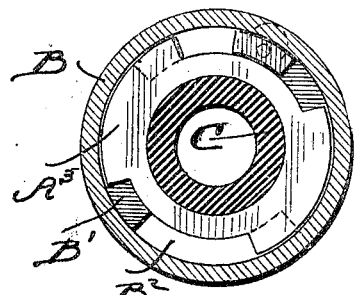
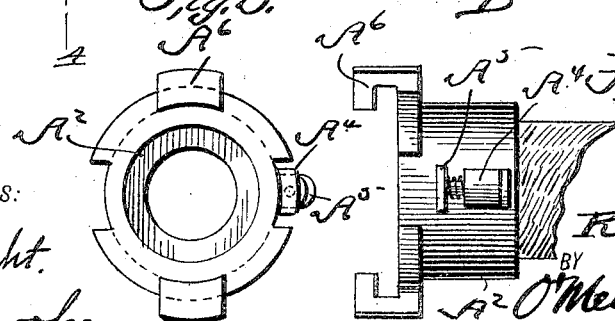
WITNESSES:
Rea P. Wright.
L. M. Brooke.
INVENTOR
R. Bates.
BY O'Meara & Brock
ATTORNEYS

UNITED STATES PATENT OFFICE.

RICHARD BATES, OF TAMAQUA, PENNSYLVANIA.

HOSE-COUPLING.

No. 822,423.  Specification of Letters Patent.  Patented June 5, 1906.

Application filed July 13, 1905. Serial No. 269,533.

*To all whom it may concern:*

Be it known that I, RICHARD BATES, a citizen of the United States, residing at Tamaqua, in the county of Schuylkill and State of Pennsylvania, have invented a new and useful Hose-Coupling, of which the following is a specification.

My invention relates to certain new and useful improvements in hose-couplings, and has for its object to provide a coupling that is simple and cheap in construction and one that can be easily detached or put together.

Another object of my invention is to provide a hose-coupling composed of sections carrying locking means, so that when the parts are assembled they are securely locked together, but can be easily disengaged when desired.

A further object of the invention is to provide a hose-coupling the meeting ends of which are connected by a rubber tube, so that all danger of leakage is prevented.

With these objects in view the invention consists in the novel features of construction and arrangement of parts hereinafter described, and pointed out in the claims, and shown in the accompanying drawings, in which—

Figure 1 is a perspective view of the parts assembled. Fig. 2 is a perspective view of the parts detached. Fig. 3 is a longitudinal section of the coupling. Fig. 4 is a sectional view taken on the line 4 4 of Fig. 3. Fig. 5 is an end view of one of the sections of the modification, and Fig. 6 is a side view of the modification.

Referring to the drawings, A and A indicate the two sections of the coupling, which are constructed alike (the description of one will answer for both) and consist of the hose-attaching part $A'$, having an enlarged head $A^2$, provided with outwardly-extending oppositely-disposed lugs $A^3$. The head $A^2$ is provided with a perforated lug $A^4$ on one side, in which is mounted a spring-actuated locking-bolt $A^5$ for the purpose hereinafter described.

Fitting over the lugs $A^3$ and adapted to lock the sections together is a binding-sleeve B, having inwardly-projecting flanges $B'$ on each side, provided with notches $B^2$, through which the lugs $A^3$ pass, and by giving the sleeve a quarter-turn the flanges will be turned over the lugs. At the same time the spring-actuated locking members $A^5$ will drop into the notches $B^2$ and prevent the parts from being disengaged until the bolt is withdrawn.

Arranged between the sections is a rubber tube C, connecting the tube $A'$ when assembled and forming a water-tight joint, so that all danger of the coupling leaking is prevented.

In the modification shown in Figs. 5 and 6 I do away with the binding-sleeve and provide the lugs $A^3$ of the coupling-section with hook-shaped members $A^6$, fitting into corresponding notches of the other section, and by giving it a quarter-turn they will be turned over the lugs $A^3$ and securely locked by the spring-actuated locking members $A^5$, hereinbefore described.

Having thus fully described my invention, what I claim as new, and desire to secure by Letters Patent, is—

1. A pipe-coupling comprising two duplicate coacting coupling members, the meeting ends of said members being adapted to bear against each other, and a flexible tube arranged within the said coupling members and bridging the joint between their meeting ends, each of the said coupling members having an exteriorly-threaded portion and the interior diameter of the flexible tube being equal to the interior diameter of the threaded portions of the coupling members.

2. In a pipe-coupling, the combination of duplicate sections, each having outwardly-projecting lugs, a flexible tube fitting in said sections and connecting the sections together, a binding-sleeve provided with notched flanges adapted to receive said lugs, and a spring-actuated bolt adapted to fit in said notches and lock the sections together, for the purpose described.

3. In a pipe-coupling, the combination of duplicate sections, each having outwardly-projecting lugs, a flexible tube connecting said sections, a binding-sleeve provided with inwardly-projecting notched flanges adapted to fit on said lugs, and a locking-bolt carried by said sections adapted to lock said sleeve on said sections, for the purpose described.

4. In a pipe-coupling, the combination of duplicate sections, each having outwardly-projecting lugs, a flexible tube connecting said sections, a binding-sleeve provided with inwardly-projecting notched flanges, through which the lugs are adapted to pass, and spring-actuated bolts carried by said sections, adapted to fit in the notches of the sleeve, and lock the sleeve on said sections, for the purpose described.

RICHARD BATES.

Witnesses:
  WM. E. WILLINGALE,
  A. G. BASTIAN.